United States Patent [19]

Chang

[11] Patent Number: 5,753,774
[45] Date of Patent: May 19, 1998

[54] FUNCTIONAL GROUP TERMINATED POLYMERS CONTAINING SULFONATE GROUP VIA SULFONATION OF ETHYLENICALLY UNSATURATED POLYMERS

[75] Inventor: Wally L. Chang, Naperville, Ill.

[73] Assignee: Witco Corporation, Greenwich, Conn.

[21] Appl. No.: 768,661

[22] Filed: Dec. 18, 1996

[51] Int. Cl.$^6$ ........................................ C08F 8/36
[52] U.S. Cl. ........................ 525/327.5; 525/329.8; 525/330.4
[58] Field of Search .................... 525/327.5, 329.8, 525/330.4, 331.8, 332.6, 333.5

[56] References Cited

U.S. PATENT DOCUMENTS

Re. 34,514   1/1994   Wernet ............................. 525/327.5
2,475,886   7/1949   Goebel ............................. 525/327.5

*Primary Examiner*—Paul R. Michl
*Attorney, Agent, or Firm*—Scully, Scott, Murphy & Presser

[57] ABSTRACT

Disclosed is a process for producing water-dispersible polymers, particularly condensation polymers such as polyesters, polyethers and polyamides, by forming an ethylenically unsaturated polymeric precursor by condensation polymerization of reactants including ethylenically unsaturated reactants and then sulfonating the ethylenic unsaturation of said polymeric precursor by reacting it with a sulfonating agent such as bisulfite, metabisulfite, or a mixture thereof.

22 Claims, No Drawings

FUNCTIONAL GROUP TERMINATED POLYMERS CONTAINING SULFONATE GROUP VIA SULFONATION OF ETHYLENICALLY UNSATURATED POLYMERS

BACKGROUND OF THE INVENTION

The present invention relates to water-dispersible polymers, and more particularly to water-dispersible polyesters, polyamides and polyethers as well as copolymers thereof.

Polyester resins, as well as polyamide and polyether resins, find use in a variety of applications, including coatings, paints, adhesives, and the like. Such resins are typically soluble in organic solvents, and exhibit little if any solubility in aqueous solvents or in systems in which water and a second water-soluble solvent are employed. Organic solvent-based resin solutions have thus typically been the vehicle of choice for use in forming coatings and the like of the resins. However, many organic solvents commonly used in conjunction with such resins present environmental problems associated with their toxicity. There has been a growing concern based on the effects of such organic solvents on the environment, as well as on the long-term health of individuals who come into contact with such solvents. There has, therefore, been a growing interest in the use of aqueous resin compositions as a means of eliminating toxicity problems associated with organic solvents, and as a means of complying with governmental edicts with respect to the use of such solvents.

Examples of aqueous polyester and other resin dispersions are known in the art. The dispersion of the resin into the aqueous medium has customarily been achieved through the use of dispersing or emulsifying agents such as nonionic or ionic surfactants. However, the use of surfactant-stabilized aqueous resin dispersions is far from desirable, since a proportion of free surfactant can be carried through to the final product, which can result in a diminution of the desired properties of the final product.

The prior art has thus attempted to incorporate moieties directly into the polymer molecule which affords greater water dispersibility to the polymer. Typically, these attempts involve copolymerization of a water-soluble or water-dispersible comonomer together with the other monomers which react together to form the desired polymer molecule. Typical of this approach is U.S. Pat. No. 3,563,942, which discloses copolymerization of an aromatic sulfonate moiety in the synthesis of the desired polyester polymer.

Similar approaches are disclosed in U.S. Pat. No. 4,525,524, U.S. Pat. No. 4,910,292, and U.S. Pat. No. 4,973,656, which disclose other techniques for copolymerizing a sulfonate-type monomer directly into the polymer when it is formed from its monomeric constituents. These techniques require very high reaction temperatures, whereas the process of the present invention can be carried out at much milder, less energy-intensive conditions.

The prior art approach to the objective of incorporating a water-dispersible moiety into the polymer molecule has other drawbacks in addition to the severe reaction conditions themselves. Notable among these is the fact that under such severe reaction conditions, the polymer easily decomposes and/or is converted to a yellowish or dark product. This decomposition is difficult to control or eliminate. Also, aromatic sulfonates can cause 1,4-butanediol, which is ordinarily a preferred reactant, to be converted to tetrahydrofuran; and can cause diethylene glycol, another preferred reactant, to be converted to dioxane. These conversions occur because of the strong acidity of the aromatic sulfonate. Both such conversions are undesirable as they lead to losses of yield and to unsatisfactory properties of the product. It is also difficult to identify satisfactory water-dispersible, e.g. sulfonate-based, comonomers which can successfully copolymerize with the other comonomers to form the desired copolymeric product. The reaction conditions that become necessary are constrained by the additional comonomer present, such that harsher reaction conditions are often required that are in turn more difficult to control.

It is thus an object of the present invention to provide an improved technique for forming water-dispersible polymeric resins, particularly resins formed by condensation polymerization such as polyesters, polyamides and polyethers, which technique affords improved ease of operation, more satisfactory yields, improved properties (such as a desirable light color of polyesters and polyethers produced by this invention), and offers a greater variety in the selection of reactants and in the range of properties of the products that can be obtained.

It is furthermore an object of the present invention to provide an improved process for obtaining such water-dispersible polymers which can be used as final products or can be used as intermediates for the subsequent formulation of other polymeric derivatives such as polyurethanes.

BRIEF SUMMARY OF THE INVENTION

One aspect of the present invention is a process for producing a water-dispersible polymer comprising: (a) forming an ethylenically unsaturated polymeric precursor which is terminated at one or both its ends with —COOH, —NH$_2$, or —OH, by condensation polymerization of reactants which upon said condensation polymerization form said polymeric precursor wherein at least a portion of at least one of said reactants contains ethylenic unsaturation; and (b) sulfonating said polymeric precursor by reacting it with a sulfonating agent such as a compound selected from the group consisting of bisulfites, metabisulfites, and mixtures thereof, under conditions such that said sulfonating agent reacts with said ethylenic unsaturation and sulfonates said polymeric precursor.

The polymeric precursor can be all of one type of polymer, or can comprise two or more (preferably up to four) blocks each of which is a polyester, a polyamide, or a polyether, wherein the blocks are either bonded directly to each other or are each bonded through a —C(O)NH—, —C(O)— or —O— linkage to an intervening alkyl moiety containing 2 to 20 carbon atoms which is saturated or contains ethylenic unsaturation; provided that adjacent blocks bonded directly to each other are types of polymer different from each other.

DETAILED DESCRIPTION OF THE INVENTION

The present invention is useful in making water-dispersible polymers, particularly water-dispersible condensation polymers. The products of process of this invention can be used per se to form coatings, films and the like. The products of the process of this invention can also be used as intermediates in the formation of other polymeric species, for instance by reacting appropriate diisocyanate compounds or other di-substituted cross linking agents with the carboxylic acid, amino, or hydroxyl substituent groups present on the polymers produced by the present invention.

The condensation polymerization reactions with which the present invention may be used include any reactions among reactants in which appropriate functionalities on the reactants react to form a covalent linkage, the reaction typically (but not always) resulting in the formation of a byproduct molecule, typically water, as a result of the reaction. The functionalities present on the reactants usually include one or both of —COOH (or anhydride) and/or —COH, and one or both of —OH and —NH$_2$. The reactants that enter into such condensation reactions are usually substituted with two, or more, of such functionalities. More often, reactants are substituted with the same functionalities (e.g., diacids, diols, diamines), but they can be substituted with two or more different functionalities (e.g., amino acids, hydroxyacids).

Preferred examples of condensation polymerization reactions include reactions which form polyesters, polyethers and polyamides. As is well known, polyesters form by the reaction of, for instance, diols with dicarboxylic acids or anhydrides thereof. Polyamides form by the reaction of, for instance, diamines with dicarboxylic acids or anhydrides thereof. Polyethers within the scope of the present invention can be formed by the polymerization of, for instance, ethylene oxide or propylene oxide under ring-opening conditions. Condensation polymerization reactions also include such reactions of glycol or alkoxy-terminated polyethylene glycol with a diacid or anhydride to form a polyester of the polyethylene glycol.

The polymers within the scope of the present invention also include those composed of blocks wherein blocks adjoining each other are different types of condensation polymers. Examples include polyester/polyamide, polyester/polyether, and polyamide/polyether. Other examples include triblock polymers, wherein the inner block is different from each of the outer blocks which can be the same as each other or different from each other. Examples include polyether/polyester/polyether, and so forth.

Also included are molecules wherein one or two polymeric chains meeting any of the descriptions herein is pendant from an alkyl moiety containing 2 to 20 carbon atoms through a —C(O)NH—, —C(O)O—, or —C—O—C— linkage. An example of this type of compound is that formed by esterifying both carboxylic functionalities of maleic acid or maleic anhydride with polyethylene glycol or polypropylene glycol at a molar ratio of glycol to maleic acid or anhydride of at least 2:1. In such molecules the necessary ethylenic unsaturation is in the polymeric chain or chains, in the $C_2$–$C_{20}$ moiety, or both.

One essential aspect of the process of the present invention is that the condensation polymer that is obtained contains ethylenic unsaturation, that is, a carbon-carbon double bond, either in the main chain of the polymer, or in a moiety or moieties of 2 to 20 carbon atoms linking polymeric blocks, or pendant from the main chain of the polymer (connected directly to the main chain by a covalent bond, or incorporated in or pendant from a longer chain which is itself pendant from the main chain of the polymer), or both. This ethylenic unsaturation is provided by carrying out the condensation polymerization with one or more reactants which participate in the condensation polymerization reaction and which also contain ethylenic unsaturation. Under conventional condensation polymerization conditions the ethylenic unsaturation survives the condensation polymerization. Of the different types of reactants present (e.g., diacid, diol, diamine, hydroxylamine, and so forth), the ethylenically unsaturated reactant can comprise all or a portion of one of the reactant types, or all or a portion of more than one of the reactant types.

Thus, for instance, the desired ethylenic unsaturation can be provided by incorporating into the reactant mixture an ethylenically unsaturated diacid, an ethylenically unsaturated anhydride (such as maleic anhydride), an ethylenically unsaturated diol, an ethylenically unsaturated diamine, or mixtures of any two or more of such compounds. Depending on the properties desired of the final product produced by the process of the present invention, all or part of the diacid component can comprise ethylenically unsaturated dicarboxylic acid and/or anhydride, all or part of the diol component can comprise ethylenically unsaturated diol compound, and all or part of the diamine component that may be employed can comprise ethylenically unsaturated diamines.

It will be understood that the reactants present in the reaction mixture, which undergoes condensation polymerization in the first step of the process of the present invention, can include one or more reactants customarily employed in the synthesis of such condensation polymers.

One reactant preferably employed in the desired condensation polymerization reaction is a diacid component by which is meant one or more dicarboxylic acids, one or more anhydrides of dicarboxylic acids, or mixtures thereof.

The dicarboxylic acids that can be used in the present invention include aliphatic dicarboxylic acids, alicyclic dicarboxylic acids, aromatic dicarboxylic acids, ethylenically unsaturated alkenyl dicarboxylic acids, or mixtures of two or more of these acids. Preferred are alkyl dicarboxylic diacids which generally contain 4 to 36 carbon atoms, and aromatic dicarboxylic diacids which generally contain 9 to 20 carbon atoms. Examples of useful dicarboxylic acids include oxalic, malonic, dimethylmalonic, succinic, glutaric, adipic, trimethyladipic, pimelic, 2,2-dimethylglutaric, azelaic, sebacic, suberic, 1,3-cyclopentanedicarboxylic, 1,2-cyclohexanedicarboxylic, 1,3-cyclohexanedicarboxylic, 1,4-cyclohexanedicarboxylic, phtlialic, terephthalic, isophthalic, tetrahydrophthalic, hexahydrophthalic, 2,5-norbornanedicarboxylic, 1,4-naphthalic, diphenic, 4,4'-oxydibenzoic, diglycolic, thiodipropionic, 4,4'-sulfonyldibenzoic, and 2,5-naphthalenedicarboxylic acids. Anhydrides of any of the foregoing are also contemplated.

Preferred difunctional dicarboxylic acids include isophthalic acid, terephthalic acid, phthalic acid, adipic acid, tetrachlorophthalic acid, pivalic acid, dodecanedioic acid, sebacic acid, azelaic acid, 1,4-cyclohexanedicarboxylic acid, 1,3-cyclohexanedicarboxylic acid, maleic acid, fumaric acid, succinic acid, 2,6-naphthalenedicarboxylic acid, glutaric acid, and any of the anhydrides thereof.

As indicated, the diacid component can comprise in whole or in part one or more ethylenically unsaturated polycarboxylic acids, especially dicarboxylic acids or their anhydrides, including but not limited to fumaric acid, maleic acid, mesaconic acid, citraconic acid, muconic acid (e.g. trans-trans muconic acid) and itaconic acid, and any anhydrides thereof, such as maleic anhydride. In general, the preferred ethylenically unsaturated dicarboxylic acids and anhydrides will contain 4 to 8 carbon atoms but may contain anywhere from 4 to 36 carbon atoms.

Diacids wherein the ethylenic unsaturation is pendant from the principle chain of the diacid are also contemplated within the scope of the present invention. Examples include any of the foregoing dicarboxylic acids and anhydrides having a pendant chain containing 2 to 8 carbon atoms at least two of which are connected by a carbon-carbon double bond, such as vinyl, propenyl, butenyl, and the like. One example is 2-vinyl-butane-1,4-dioic acid.

Diol compounds that can be used in the present invention include glycols, of which ethylene glycol is the preferred diol.

In cases where glycols in addition to, or instead of, ethylene glycol are utilized, it is preferable for them to contain from 3 to 10 carbon atoms. In cases where glycol ethers are utilized in conjunction with ethylene glycol in the diol component, it is preferable for them to contain from 4 to 10 carbon atoms. Some representative examples of glycols that can be used in conjunction with or instead of ethylene glycol include 1,3-propylene glycol, 1,2-propylene glycol, 2,2-diethyl-1,3-propanediol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, 2,4-dimethyl-2-ethylhexane-1,3-diol, 1,2-cyclohexanediol, 1,3-cyclohexanedimethanol, 1,4-cyclohexanedimethanol, p-xylenediol, and 2,2,4,4-tetramethyl-1,3-cyclobutanediol.

As the diol component, polyether glycols can also be used, such as polypropylene glycol having a molecular weight of 200 to 6,000 (examples of which include "Rezol ED-1000" and "Rezol ED-2000", sold by Witco Corp.); polyethylene glycol having a molecular weight of 200 to 6,000 (examples of which include "Rezol PEG-400" and "Rezol PEG-1000", sold by Witco Corp.); and block and random copolymers of propylene glycol and ethylene glycol, having a molecular weight of 200 to 6,000 (examples of which include "Rezol EPD-112", "Rezol EPD-225", "Rezol EPD-56", and "Rezol EPD-28", sold by Witco Corp.)

Preferred ethylenically unsaturated diol compounds contain 4 to 10 carbon atoms. Examples of such compounds include allyl diglycol, as well as any ethylenically unsaturated analogs of the exemplary glycols set forth hereinabove.

Included within the scope of ethylenically unsaturated diols useful in the process of the present invention are those wherein the ethylenic unsaturation is present in, or in a substituent pendant from, the chain connecting the two diol groups. Preferred examples include the mono-acrylates and mono-methacrylates of triols (preferably containing 2 to 20, and more preferably 2 to 6, carbon atoms) such as glycerol, wherein two hydroxyl groups remain available to cooperate in the formation of the polyester molecule. Other examples of satisfactory ethylenically unsaturated diols include 1,4-butenediol, 1,4-butynediol, glycerine allyl ether and glyceryl monostearate.

If branching is desirable, then it will be advantageous to use a branching agent in the condensation polymerization reaction. Such branching agents may contain three or more functional groups, and they preferably contain three or four functional groups. The reactive groups may be carboxyl or aliphatic hydroxyl. The branching agent may contain both types of groups. Examples of acidic branching agents include trimesic acid, trimellitic acid, pyromellitic acid, butanetetracarboxylic acid, naphthalene tricarboxylic acids and cyclohexane-1,3,5-tricarboxylic acid. Examples of hydroxyl branching agents (polyols) include glycerin, trimethylolpropane, pentaerythritol, dipentaerythritol, 1,2,6-hexanetriol and 1,3,5-trimethylolbenzene. Examples of hydroxy acid branching agents are 2,2-dihydroxymethyl propionic acid, 10,11-dihydroxy-undecanoic acid, and 5-(2-hydroxyethoxy)isophthalic acid. Generally from 0 to 3 percent of a polyol containing from 3 to 12 carbon atoms will be used as the branching agent (based upon the total diol component).

Instead of, or in addition to, the diol and polyol components, there can be present a diamine component. One type of suitable diamine is di-amino-substituted alkyl, and alkylene compounds, preferably containing 3 to 8 carbon atoms, examples of which include compounds analogous to the aforementioned saturated, and ethylenically unsaturated, glycols and diols, wherein the hydroxyl substituents are replaced by amino groups.

Another type of suitable diamine is diamine-substituted polyoxyalkylene compounds, preferably poly(ethoxy) or poly(propoxy) compounds endcapped with aminopropyl groups. Examples of this type of reactant include compounds generalizable by the formula

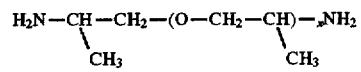

known as Jeffamine D230, D400, D2000, and D4000 (previously sold by Texaco Chemical Co., now Huntsman Chemical) corresponding to said formula wherein x is 2–3, 5–6, about 33, and about 68, respectively.

As indicated, condensation polymers useful in this invention also include bifunctional compounds such as hydroxy-acids and amino acids, which are polymerized head-to-tail in known manner. Such reactants would have to include some ethylenically unsaturated compounds. Examples of such reactants include 6-hydroxy (or 6-amino) hexenedioic acid, and the like.

The acid component (which, as defined above, comprises one or more acids and/or anhydrides) and the one or more reactants destined to react with the acid or anhydride component are selected so that the reactants that enter into the condensation polymerization include a sufficient amount of ethylenic unsaturation so that the sulfonation which occurs in the second step of the process of the present invention provides a satisfactory degree of water dispersibility in the polymer.

Thus, the amount of reactant bearing ethylenic unsaturation can comprise 1 mol. % to 50 mol. % of the reaction mixture. Generally, the unsaturated reactant(s) comprise about 1 mol. % to about 10 mol. % of the reaction mixture. The reactants are otherwise selected to be approximately equimolar in relationship to each other with the proviso that the component which carries the substituent group identical to the desired terminal group or groups of the polymer should be provided in stoichiometric excess.

Thus, for instance, if it is desired that the polymer product contains carboxylic terminal groups, then an excess of the acid component should be provided. If it is desired that the polymer should be endcapped with hydroxyl terminal groups, then an excess of the diol component should be supplied. On the other hand, if it is desired that the polymer should be endcapped with amino terminal groups, then an excess of the diamine component should be supplied. It should be recognized that for these purposes the terms "diacid component," "diol component," and "diamine component" are intended to include all components of the reaction mixture whether or not ethylenically unsaturated. It will also be recognized that to ensure that the polymer is capped with the desired terminal groups, it may be necessary to provide in the reaction mixture more than simply a slight stoichiometric excess of the indicated component; the degree of excess is tempered, however, by the effect of that excess on the distribution of polymeric chain lengths formed by the condensation polymerization.

The condensation polymer can also be one which contains only one terminal carboxylic acid, hydroxyl or amino group. For instance, a $C_1$–$C_6$ alkoxy (e.g. methoxy)-capped polyethylene glycol is reacted with ethylene glycol, acetic anhydride and maleic anhydride to form a polyester which is capped with a hydroxyl group and a methyl group, and which contains ethylenic unsaturation. In addition, one can prepare a polymer that is mono-capped with a desired functional group by preparing a condensation polymer which is disubstituted with functional terminal groups, and then capping one end of the molecule. For instance, a diamine-capped or di-hydroxyl-capped polymer can be reacted with a lower ($C_1$–$C_6$) alkanoic carboxylic acid to cap one end of the polymer with an ester or amide. Likewise, a dicarboxylic acid-capped polymer can be reacted with a ($C_1$–$C_6$) alcohol or ($C_1$–$C_6$) alkyl amine, to cap one of the two carboxylic acid moieties with an ester or amide.

The reaction mixture is then subjected to condensation polymerization conditions effective to cause the reactants to react with each other to form the desired condensation polymers. In general, effective condensation polymerization conditions are readily familiar to (and ascertainable by) the practitioner. It is preferred not to carry out the reaction in a solution. However, if a solvent is desired, it should be high boiling (i.e. a boiling point above about 140° C.) Examples of suitable solvents include DMF (dimethylformamide), DMA (N,N-dimethylacetamide), xylene and DMSO.

Preferably, the reactant mixture for carrying out the condensation polymerization includes a small but effective amount such as up to about 0.02 wt. % of a catalyst for the polymerization. Useful catalytic compounds include protonic acids, tin compounds, titanium compounds and antimony compounds.

Typical condensation polymerization conditions are provided by exposing the reactants to temperatures on the order of about 150° C. to about 250° C. During the progress of the reaction, it is preferred to draw off water of condensation. To effectively carry out the desired condensation polymerization it is preferred to use nitrogen to purge the reaction mixture in order to carry out the water.

The chain length or molecular weight of the polymers that are useful and produced in the process of the present invention can fall within a rather wide range; typically, useful polymers will have a molecular weight in the range of about 200 to about 50,000. Thus, amounts and identities of the reactants can readily be tailored to achieve any desired molecular weight and distribution.

At the end of the condensation polymerization, the product can be recovered and separated from the reaction mixture, or can be subjected to the sulfonation reaction in situ without first being recovered.

Sulfonation is carried out by reacting the polymer under appropriate sulfonating conditions with a sulfonating agent which comprises one or more bisulfites and/or one or more metabisulfites. Preferred sulfonating agents are the ammonium and alkali metal sulfites and alkali metal metabisulfites. Thus, the more preferred sulfonating agents are sodium bisulfite and sodium metabisulfite. Other preferred sulfonating agents include lithium bisulfite, lithium metabisulfite, potassium bisulfite, potassium metabisulfite, ammonium bisulifite and ammonium metabisulfite.

Sulfonation should be carried out using a stoichiometric excess of the sulfonating agent, calculated on the basis of the degree of ethylenic unsaturation present in the condensation polymer resulting from the foregoing condensation polymerization step. The sulfonation is preferably carried out in a suitable solvent such as water. Satisfactory sulfonation conditions include maintaining a temperature of about 10° C. to about 120° C. for a time on the order of 2–15 hours. The sulfonation also can be catalyzed by fine air bubbles purged through the reaction medium. Any peroxide can also be used as a catalyst in this step, such as hydrogen peroxide, benzoyl peroxide, t-butyl hydrogen peroxide, and many others known in this field.

The process of the present invention affords several significant advantages compared to other processes for producing water-dispersible sulfonated polymers. In particular, each of the foregoing steps can be carried out under relatively mild conditions and are not particularly constrained by the choice of reactants. In particular, a much greater freedom in choice of reactants is provided, as the reactants in the condensation polymerization step can be polymerized under relatively straightforward condensation polymerization conditions and the sulfonation step can be carried out under fairly conventional sulfonation conditions. This freedom in the choice of reactants is an advantage in that it affords greater range in the tailoring of the properties of the final, water-dispersible product.

In addition, the ability to select the identity of the terminal groups on the polymers affords the operator greater freedom in incorporating the process of the present invention into processes that use the water-dispersible product as an intermediate in the synthesis of, for example, polyurethanes by reaction of the appropriately end-capped polymer with other reactive species such as diisocyanates or additional quantities of dicarboxylic acids, as the case may be.

The invention will be described further in the following examples. These examples are intended for illustrative purposes, and are not intended to limit the scope of applicants' invention.

EXAMPLE 1

Sodium Sulfonate-Containing Polyesters with Hydroxyl Terminated End Groups

| Raw Materials: | |
| --- | --- |
| 1,4-Butanediol | 857 grams |
| 1,6-Hexanediol | 1,124 grams |
| Adipic Acid | 2,074 grams |
| Maleic Anhydride | 155 grams |
| Total Load | 4,210 grams |
| Organotin catalyst | 0.30 grams |
| Water to distill | 540 grams |
| Theoretical Yield | 3,670 grams |
| Sodium Bisulfite | 162 grams |
| Water | 379 grams |

Procedure:

A four neck glass flask, equipped with a nitrogen inlet, a stirrer, a column, and a thermometer, was charged with catalyst, 1,4-butanediol, 1,6-hexanediol, and maleic anhydride, and the contents were heated to approximately 80° C. Adipic acid was added at an appropriate rate for the reaction to proceed under control. The temperature was increased to 225° C., while the column was kept hot using steam. The nitrogen and agitation were increased, as the reaction proceeded, to facilitate the water removal, but not rapid enough to expel the glycol.

The hydroxyl value and acid number were checked as needed and the loss of glycol during the reaction was adjusted to reach the theoretical hydroxyl value. Reaction was considered complete when the hydroxyl number and the acid number reached the expected values.

The reactor contents were then cooled to 85° C. The column was replaced with a water condenser and nitrogen was shut off. A clear water solution of sodium bisulfite was added under constant agitation, and the temperature was maintained at 75° to 80° C. for 8 hours. Vacuum was then applied in order to strip the water, and reaction was considered complete when the percent moisture value reached the desired result. The final product had a hydroxyl number of 93.6, an acid number of 0.65, a moisture content of 0.06%, a viscosity at 40° of 16,300 cps, an active anionic group of 0.344 meq/g, and a sulfonation conversion of 88.3%. The polymer, a sulfonated polyester, was dispersed in water very easily, and the dispersed polyester demonstrated good stability.

EXAMPLE 2

Sodium Sulfonate-Containing Polyesters with Dihydroxyl Terminated End Groups

| Raw Materials: | |
| --- | --- |
| Ethylene Glycol | 1,187 grams |
| Adipic Acid | 2,163 grams |
| Maleic Anhydride | 156 grams |
| Total Load | 3,506 grams |
| Organotin Catalyst | 0.30 grams |
| Water to Distill | 562 grams |
| Theoretical Yield | 2,936 grams |
| Sodium Bisulfite | 165 grams |
| Water | 660 grams |

Procedure:

A four neck glass flask, equipped with a nitrogen inlet, a stirrer, a column, and a thermometer, was charged with catalyst, ethylene glycol, and maleic anhydride and heated to approximately 80° C. Adipic acid was added at an appropriate rate for the reaction to proceed under control. The temperature was increased to 225° C., while the column was kept hot using steam. The nitrogen and agitation were increased, as the reaction proceeded, to facilitate the water removal, but not rapid enough to expel the glycol.

The hydroxyl value and acid number were checked as needed, and the loss of glycol during the reaction was adjusted to reach the theoretical hydroxy value. Reaction was considered complete when the hydroxyl number and the acid number reached the expected values.

The reactor contents were then cooled to 85° C. The column was replaced with a water condenser, and nitrogen was shut off. A clear water solution of sodium bisulfite was added under constant agitation, and the temperature was maintained at 75° to 80° C. for 8 hours. Vacuum was then applied in order to strip the water, and reaction was considered complete when the percent moisture value reached the desired result. The final product had a hydroxyl number of 96.6, an acid number of 1.00, and a moisture content of 0.08%. The polymer, a sulfonated polyester, was dispersed in water very easily, and the dispersed polyester demonstrated good stability.

EXAMPLE 3

| Sodium Sulfonate -Containing Polyamide with Diamino Terminated End Groups | |
| --- | --- |
| Raw Materials: | |
| Jeffamine D-400* | 357.2 grams |
| Maleic Anhydride | 30.6 grams |
| Total Load | 387.8 grams |
| Water to Distill | 5.6 grams |
| Theoretical Yield | 382.2 grams |
| Sodium Bisulfite | 32.6 grams |
| Water | 76.0 grams |

*("Jeffamine D-400" has the structure $H_2N-CH(CH_3)CH_2-(OCH_2CH(CH_3))_{5-6}-NH_2$).

Procedure:

A four neck glass flask, equipped with a nitrogen inlet, a stirrer, a column, and a thermometer, was charged with Jeffamine D-400 and maleic anhydride. The temperature was increased to 200° C., while the column was kept hot using steam. The nitrogen and agitation were increased, as the reaction proceeded, to facilitate the water removal.

Amine value and acid number were checked as needed. Reaction was considered complete when the amine number and the acid number reached the expected values.

The reactor contents were then cooled to 85° C. The column was replaced with a water condenser, and nitrogen was shut off. A clear water solution of sodium bisulfite was added under constant agitation, and the temperature was maintained at 75° to 80° C. for 8 hours. Vacuum was then applied in order to strip the water, and reaction was considered complete when the percent moisture value reached the desired result. The polymer, a sulfonated polyamide, was dispersed in water very easily, and the dispersed polyamide demonstrated good stability.

EXAMPLE 4

| Sodium Sulfonate-Containing Polyester with Dicarboxylic Acid Terminated End Groups | |
| --- | --- |
| Raw Materials: | |
| Diethylene Glycol | 1,394 grams |
| Adipic Acid | 2,082 grams |
| Maleic Anhydride | 171 grams |
| Total Load | 3,647 grams |
| Water to Distill | 448 grams |
| Theoretical Yield | 3,200 grams |
| Sodium Bisulfite | 181 grams |
| Water | 726 grams |

Procedure:

A four neck glass flask, equipped with a nitrogen inlet, a stirrer, a column, and a thermometer, was charged with diethylene glycol and maleic anhydride and heated to approximately 80° C. Adipic acid was added at an appropriate rate for the reaction to proceed under control. The temperature was increased to 225° C., while the column was kept hot using steam. The nitrogen and agitation were increased, as the reaction proceeded, to facilitate the water removal, but not rapid enough to expel the glycol.

Hydroxyl value and acid number were checked as needed, and the loss of glycol during the reaction was adjusted to reach the theoretical acid value. Reaction was considered complete when the hydroxyl number and the acid number reached the expected values.

The reactor contents were then cooled to 85° C. The column was replaced with a water condenser, and nitrogen was shut off. A clear water solution of sodium bisulfite was added under constant agitation, and the temperature was maintained at 75° to 80° C. for 8 hours. Vacuum was then applied in order to strip the water, and reaction was considered complete when the percent moisture value reached the desired result. The final product had an acid number of 95.0, an active anionic group of 0.464 meq/g, and a sulfonation conversion of 86.4%. The polymer, a sulfonated polyester, was dispersed in water very easily, and the dispersed polyester demonstrated good stability.

What is claimed is:

1. A process for producing a water-dispersible polymer comprising:

(a) forming an ethylenically unsaturated polymeric precursor, terminated at one or both ends thereof with a functional group selected from the group consisting of —OH, —NH$_2$ and —COOH, by condensation polymerization of reactants capable of undergoing condensation polymerization, wherein at least one of said reactants contains ethylenic unsaturation; and (b) sulfonating said ethylenically unsaturated polymeric precursor by reacting it with a sulfonating agent under conditions such that said sulfonating agent reacts with said ethylenic unsaturation and sulfonates said precursor.

2. A process according to claim 1 wherein said sulfonating agent is selected from the group consisting of bisulfites, metabisulfites, and mixtures thereof.

3. A process according to claim 1 wherein said ethylenically unsaturated polymeric precursor is a polyester.

4. A process according to claim 3 wherein said ethylenically unsaturated precursor polymer is terminated at one or both ends thereof with the same functional group selected from the group consisting of —OH and —COOH.

5. A process according to claim 1 wherein said ethylenically unsaturated polymeric precursor is a polyamide.

6. A process according to claim 5 wherein said ethylenically unsaturated precursor polymer is terminated at one or both ends thereof with a functional group selected from the group consisting of —OH, —NH$_2$ and —COOH.

7. A process according to claim 1 wherein said ethylenically unsaturated polymeric precursor is a polyether.

8. A process according to claim 7 wherein said ethylenically unsaturated precursor polymer is terminated at one or both ends thereof with a functional group selected from the group consisting of —OH, —NH$_2$ and —COOH.

9. A process according to claim 1 wherein said ethylenically unsaturated polymeric precursor is a polyester formed by condensation polymerization of a diacid and a diol one or both of which are ethylenically unsaturated.

10. A process according to claim 1 wherein said ethylenically unsaturated polymeric precursor is a polyamide formed by condensation polymerization of a diacid and a diamine one or both of which are ethylenically unsaturated.

11. A process according to claim 1 wherein said ethylenically unsaturated polymeric precursor comprises two or more blocks, each of which is a polymer selected from the group consisting of polyesters, polyamides, and polyethers, which blocks are either bonded directly to each other or are each bonded through a —C(O)NH—, —C(O)O— or —O— linkage to an intervening moiety containing 2 to 20 carbon atoms which is saturated or contains ethylenic unsaturation; provided that blocks which are bonded directly to each other are of types different from each other.

12. A process according to claim 11 wherein said polymeric precursor comprises a polyester block and a polyamide block.

13. A process according to claim 11 wherein said polymeric precursor comprises a polyester block and a polyether block.

14. A process according to claim 11 wherein said polymeric precursor comprises a polyether block and a polyamide block.

15. A water-dispersible polymer prepared by the process of claim 1.

16. A water-dispersible polymer prepared by the process of claim 3.

17. A water-dispersible polymer prepared by the process of claim 5.

18. A water-dispersible polymer prepared by the process of claim 7.

19. A water-dispersible polymer prepared by the process of claim 11.

20. A water-dispersible polymer prepared by the process of claim 12.

21. A water-dispersible polymer prepared by the process of claim 13.

22. A water-dispersible polymer prepared by the process of claim 14.

* * * * *